Jan. 10, 1967  D. L. SHELTON  3,296,985
OSCILLATING PLOW AND FERTILIZING APPARATUS
Filed May 24, 1963  4 Sheets-Sheet 1

INVENTOR
Dothan L. Shelton

BY

ATTORNEY

INVENTOR
Dothan L. Shelton

ATTORNEY

Jan. 10, 1967  D. L. SHELTON  3,296,985
OSCILLATING PLOW AND FERTILIZING APPARATUS
Filed May 24, 1963  4 Sheets-Sheet 3
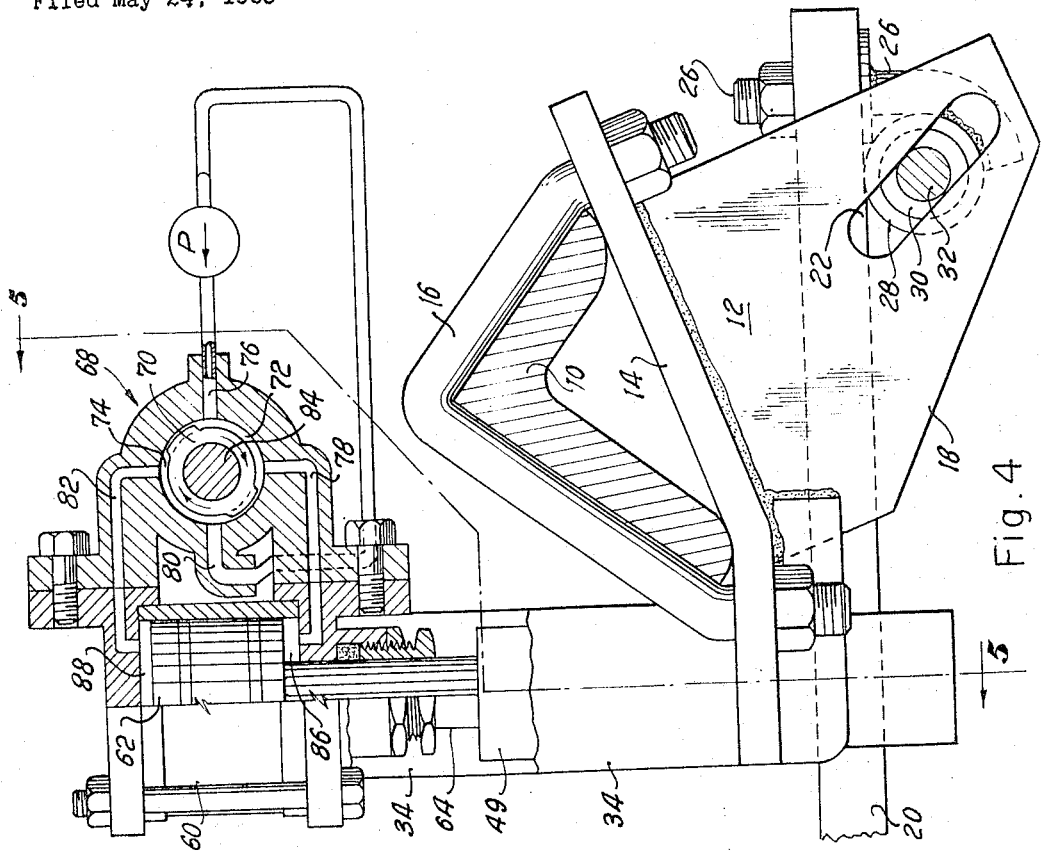
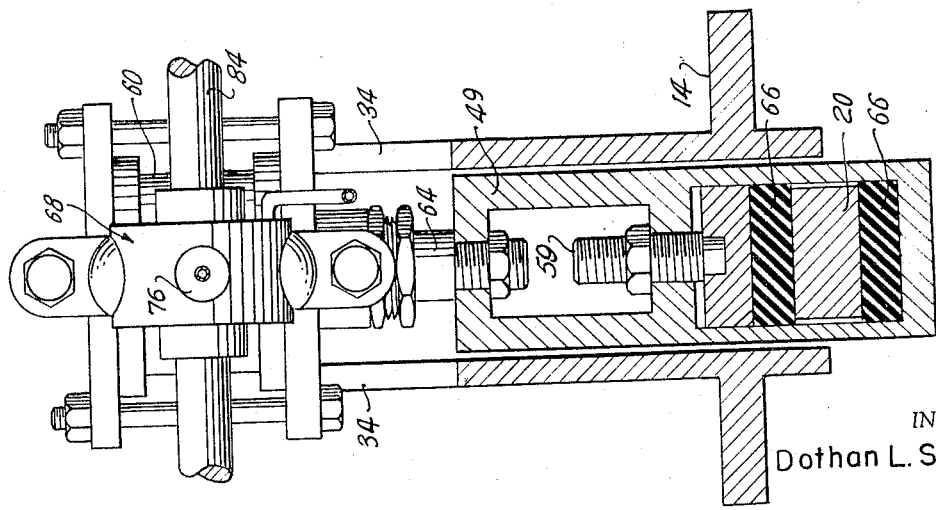
INVENTOR
Dothan L. Shelton
BY
ATTORNEY

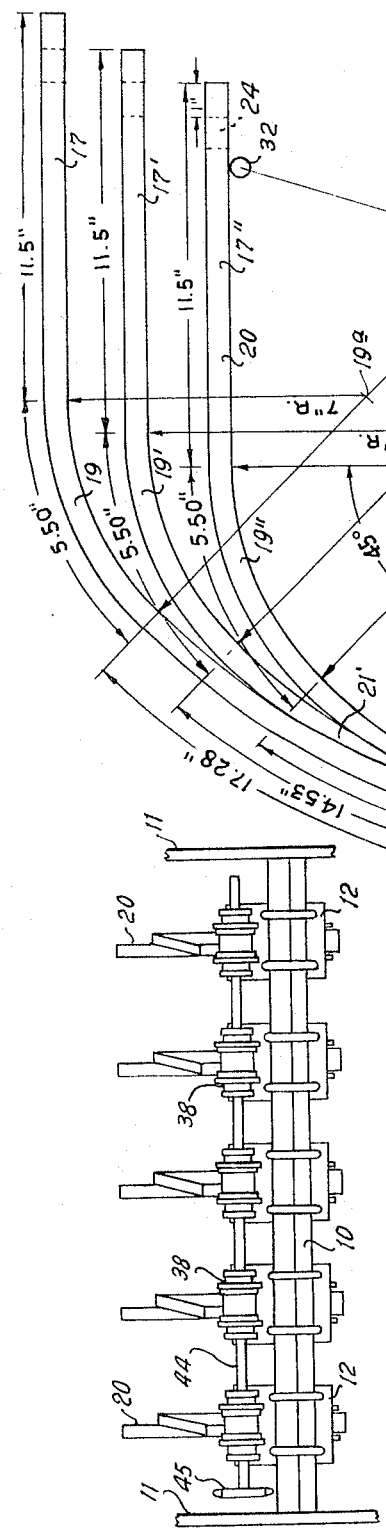
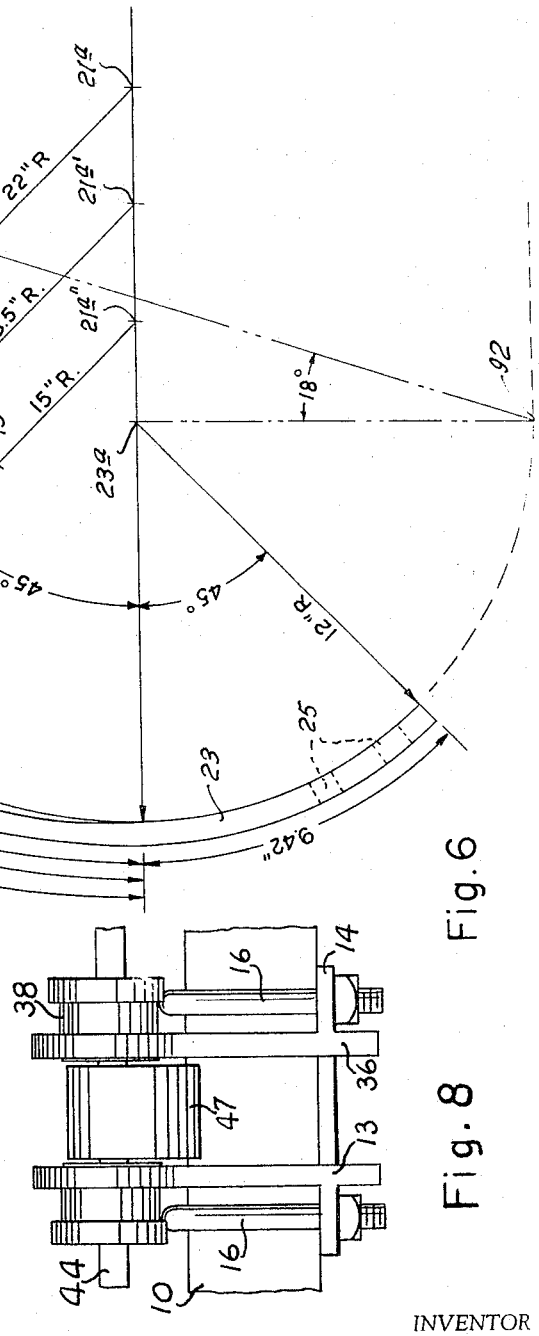
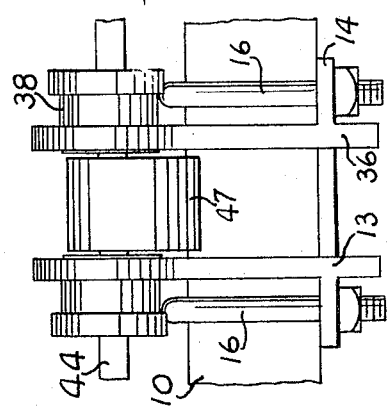
Fig. 6
Fig. 7
Fig. 8
INVENTOR
Dothan L. Shelton
ATTORNEY 3,296,985
OSCILLATING PLOW AND FERTILIZING
APPARATUS
Dothan L. Shelton, 2100 S. Polk, Amarillo, Tex. 79109
Filed May 24, 1963, Ser. No. 283,151
13 Claims. (Cl. 111—7)

This application is a continuation-in-part of my copending application for "Sobsoil Plow and Shank," Serial No. 243,938, filed December 11, 1962 and now Patent No. 3,148,738. This invention pertains to earth tillage implements and more particularly to earth furrowing implements of the type disclosed in my United States Patent No. 2,699,715 entitled "Earth Furrowing Apparatus."

Such prior art implements are provided with a plurality of flexible tool carrying shanks formed from a spring steel bar usually of rectangular or square cross section and provided with an upper horizontal segment having a single bolt hole for attachment to a frame member. Rearwardly of the horizontal segment, the shank is curved downwardly in an arc curved on an axis normal to the direction of draft so as to present its wider dimension to the line of draft. The lower end of the shank is provided with two holes for attachment of tillage tools (plow point). The curved portion of the shank is usually turned around a center on an even radius of from 9 to 15 inches according to the tillage depth and ground clearance desired. Because each different size of shank is curved on a different radius, it is necessary to use specifically designed plow points to fit each specific size of shank. A plow point designed for a nine inch radius will not work satisfactorily on a twelve or fourteen inch radius shank. Nor will a plow point designed for a twelve inch radius shank work on a nine inch radius shank.

Generally if it is desired to increase the clearance of a shank, the radius is increased the required amount. As the radius is increased, the arc of curvature is increased and the body of the shank lengthened. The lengthening of the shank body tends to reduce its resistance to flexing so that it loses its vibratory action. This tendency is overcome in the conventional spring shank by thickening the body of the shank. Obviously, to increase the body of the shank in both length and weight will add to the cost of manufacture.

The improved shank herein disclosed overcomes these objectionable features by novel means hereinafter fully described, whereby all sizes of shank are adaptable to a uniform pattern of tillage tools and increased clearance of the shank is provided with a minimum lengthening of the shank body.

The flexible spring type shank herein discussed is designed to vibrate or oscillate from the naturally induced spring action resulting from the resistance of the tillage tool point to the earth as it is moved through the ground. It is a well established fact that such vibratory action imparted to the tillage tool has the effect of greatly reducing the power required to move the tillage point through the earth. However, under certain conditions naturally induced vibration is damped or killed as in heavy or wet earth, or in deep tillage. In order to provide for vibratory action in the tool point under all conditions and thereby insure lighter draft on the one hand and deeper penetration on the other, my invention as herein disclosed provides power means of activating the tool carrying shank so applied that it enhances or magnifies the naturally induced vibration inherent in the flexible spring shank.

Fertilizer injection tools have been devised for the purpose of applying gaseous soil treatment material such as chemical fertilizers in the form of anhydrous ammonia gas to the earth as disclosed in United States Letters Patent No. 2,285,932 issued to Floyd H. Leavitt. However, there is a very serious problem encountered in the injection of anhydrous ammonia gas with conventional equipment and methods, and that is the loss of gaseous anhydrous ammonia to the atmosphere in the process of injection. Most of this loss occurs as a result of shallow injection and the escape of the gas through the furrow opening occuring immediately behind the injection tool as it is moved through the ground and before the loosened soil can fall back into the furrow and seal in the ammonia gas.

This condition is overcome in my invention by novel means including an injection tool comprising an opening blade, a flexible injection nozzle and a cover shoe in combination with a flexible spring shank and power means for imparting vibratory action thereto for deep penetration of the injection point and immediate coverage of the furrow for entrapment of the gaseous fertilizer in the earth.

This invention has for its purpose to provide an earth tillage implement having in combination an improved oscillating tool carrying shank provided with an improved gaseous material injection tool and power driven oscillating means for imparting vibratory action to the injection tool for easier draft, deep earth penetration and immediate coverage of the furrow for entrapment of the gaseous material.

An object of this invention is to provide a power driven tool carrying shank and shank supporting clamp designed to impart oscillating or vibratory action to the tool point for easier draft and deeper earth penetration.

Another object of this invention is to provide improved power means of inducing oscillation in the tool carrying shank for the purpose of imparting vibration to the tillage point.

Another object of this invention is to provide a mechanism to induce vibrations of approximately 1,000 vibrations per minute to break up the subsoil structure and provide lighter draft for the plow.

Another object of this invention is to provide a shank and associated mechanism which causes the plow to vibrate approximately parallel to the direction of draft.

Another object of this invention is to provide a method and means for inducing oscillation to each shank of a plurality of shanks and provide method and means for phasing this oscillation so that the frame with the several shanks is "balanced" so that undue vibration is not induced into the shank carrying frame.

Another object of this invention is to provide hydraulic means for inducing oscillation in the tool carrying shank for the purpose of imparting vibration to the tillage point.

Another object is to provide improved mechanical means for inducing oscillation in the tool carrying shank for the purpose of imparting vibration to the tillage point.

Another object of this invention is to provide an improved connection from the means for inducing oscillation into the shank itself.

It is a purpose of this invention to provide an improved tool carrying shank having flexing characteristics especially adaptable to power induced vibratory action for easier draft and deeper earth penetration.

A further object of this invention is to provide an improved tool carrying shank having flexing characteristics designed to increase naturally induced vibration in the tool point as it is moved through the earth.

A further object of this invention is to provide an improved design for a flexible tool carrying shank whereby a uniform pattern of tool points may be used on all sizes of such shank.

A still further object of this invention is to provide a curved spring steel shank so designed that it will provide a maximum of clearance with a minimum weight and length of material, thereby giving improved action and minimum of cost to manufacture.

A still further object of this invention is to provide an improved earth furrowing and fertilizer injection tool for more efficient application to the earth of gaseous material and method thereof.

Still further objects are to achieve the above with a device that is sturdy, compact, durable, simple, versatile, and reliable, yet inexpensive and easy to manufacture and operate.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawing, the different views of which are not necessarily to the same scale, in which:

FIG. 4 is an elevational view of hydraulic means for oscillating a tool carrying shank partially broken away for clarity.

FIG. 5 is a partial sectional view of FIG. 4 on lines 5—5.

FIG. 6 is a schematic view of tool carrying shanks embodying my invention.

FIG. 7 is a plan view of a plurality of shanks as shown in FIG. 1 attached to a part of the frame.

FIG. 8 is a rear elevational view of an eccentric counterbalance for balancing the frame members against vibration.

For the sake of brevity all conventional parts not essential to a clear description of this invention have been omitted.

Figure 1:
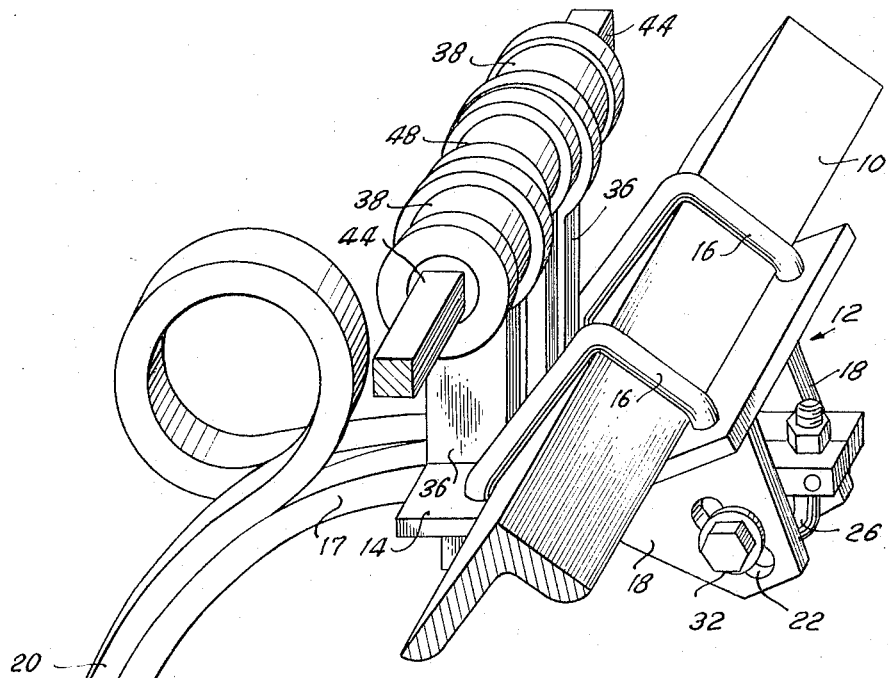
FIG. 1 is a perspective view of an oscillating shank assembly and fertilizer injection tool embodying my invention.
Figure 2:
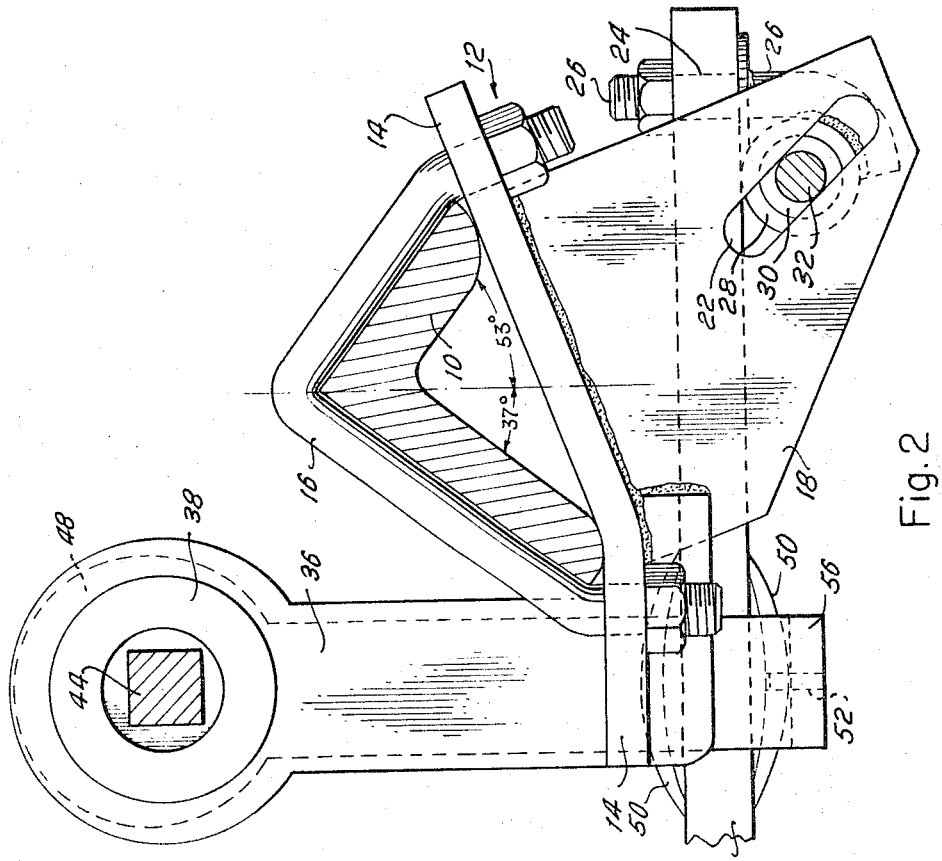
FIG. 2 is an elevational view of mechanical means for oscillating a tool carrying shank.
Figure 3:
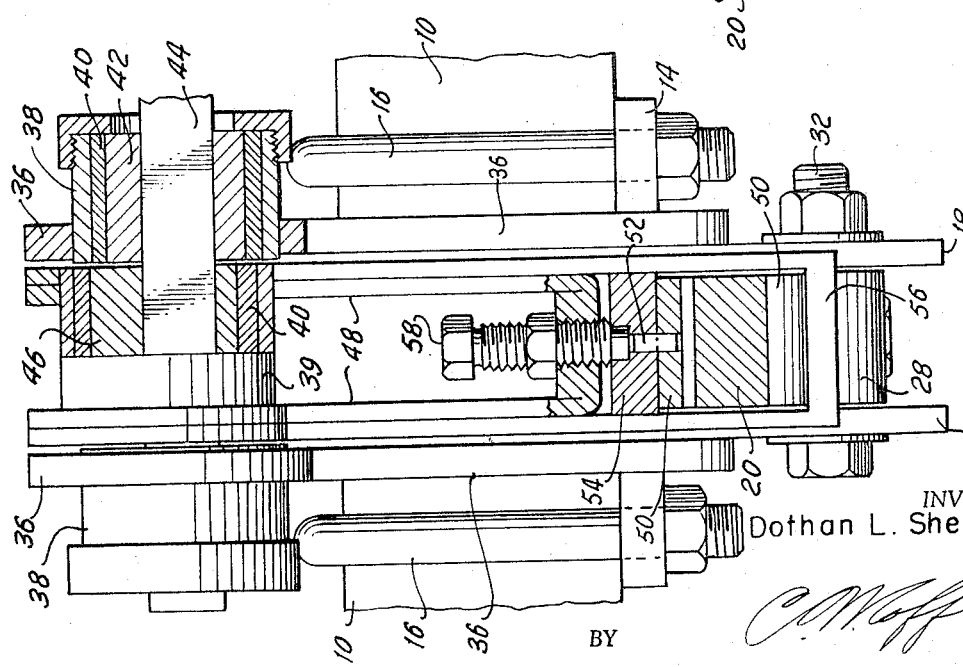
FIG. 3 is a rear elevational view of the mechanism illustrated in FIG. 2, partially broken away for clarity.

The preferred embodiment of this invention provides an elongated horizontal frame member 10 which may be of any desired shape, but as herein disclosed is of inverted angle iron construction (FIG. 1). As seen in FIG. 7 the frame member 10 is attached on either end of its length to a frame member 11 which is only partially shown and which forms part of the entire plow carrying frame. There is provided a shank mounting clamp 12 which has a base plate 14 and V-bolts 16 by which it is secured to the frame member 10. Two supporting flanges 18 depend from the base plate 14. These flanges 18 are spaced apart to provide space therebetween for passage of the forward end of a tool carrying shank 20. (See also FIGS. 2 and 3). There is provided in each of the flanges 18 matching elongated slots 22 set at a 45 degree angle to the horizontal in order to provide an adjustable means for mounting the forward end of the shank 20. Each shank 20 is provided at its forward end with a vertical hole 24 through which is passed a bolt 26 which is secured to the shank 20 by means of a conventional threaded nut. The bolt 26 is integral with a horizontal sleeve 28 having its axis normal to the direction of draft and in which is inserted a bearing sleeve 30. A bolt 32 is passed through slots 22 in the flanges 18 and the bearing sleeve 30. A suitable threaded nut is provided on the bolt by which it is secured firmly in position, the bearing sleeve 30 being firmly clamped between the flanges 18 when the nut is tightened on the bolt 32. The sleeve 28 being of slightly shorter length than the bearing sleeve 30 is left free to oscillate with the shank 20.

The base plate 14 is extended rearwardly and is provided with an opening corresponding with the space provided between the two flanges 18. Bearing support brackets 36 are mounted on the rearward portion of the base plate 14 at each side of said opening extending upward. Each of these brackets 36 is provided with a sleeve 38 in which is mounted a bearing 40. Within the bearing 40 is mounted an inner bearing 42, through which is passed a square drive shaft 44. The drive shaft 44 is passed through a square opening provided in the inner bearing 42 so that the inner bearing 42 will rotate with the drive shaft.

Intermediate the two bearing support brackets 36 there is provided a connecting rod assembly 48 which is provided on its upper end with a sleeve 39 and a like bearing assembly as the drive shaft bearing assembly, except that the connecting rod bearing assembly is provided with an eccentric inner bearing 46. The drive shaft 14 being of square stock is passed through square openings provided in the inner bearings 42 and 46 so as to rotate these bearings. The drive shaft bearings 42 being of concentric design and the connecting rod bearing 46 being of eccentric design, it is obvious that rotation of the drive shaft 44 will impart an oscillatory motion to the connecting rod assembly 48.

The lower end of the connecting rod assembly 48 is connected to the tool carrying shank 20 by means of a clamping device consisting of two arcuate metal leaf springs 50 which are mounted one above and one below the shank 20 and are held in position by means of pins 52 which are secured to thrust blocks 54 and 56 which form a part of the connecting rod assembly 48. The upper thrust block 54 is adjustable by means of screw 58 so as to increase or decrease the pressure exerted by springs 50 on the shank 20, thereby increasing or decreasing the movement of the shank 20 in response to the oscillatory movement of the connecting rod assembly 48. The two leaf springs 50 serve the further purpose of providing a cushioned contact between the connecting rod assembly 48 and the shank 20 to prevent crystallization and breakage of shank 20.

In operation, as the implement is moved forward, power is applied by conventional means including sprocket 45 (FIG. 7) to rotate the shaft 44 through the eccentric bearing 46 to oscillate the connecting rod assembly 48 and the shank 20 to which it is attached. This movement imparts a vibrating action to the plow point or tool 92 and thereby drives it through the earth with a great deal less power than required for a static shank. It will be possible with this device to till the soil at greater depths and with much more efficiency than with conventional devices.

It has been found that if these vibrations into the plow point are induced at a frequency of about 1,000 vibrations per minute, that it creates a shock wave within the subsoil structure causing the structure of the soil to fracture approximately two or three inches in front of the plow point itself. It has been found that in hard soils, that lower frequencies will cause a shock wave to develop. In extremely hard, dry soil, the shock wave will develop at as low a frequency as 800 vibrations per minute. In softer soils, as might be caused by moisture conditions, it may be necessary to go above 1,000 vibrations per minute to cause this fracturing of the subsoil structure in front of the plow point. Of course, the advantage of causing the soil structure to fracture in front of the plow point is lighter draft upon equipment and less power required, both to induce the vibration and to move the plow forward.

The various shanks 20 may be spaced along the horizontal frame member 10 according to the desires of the operator. If it is desired that the shank 20 be closer together, the nuts of the bolts 16 may be loosened and the entire clamp 12 and shank 20 be shifted along the frame member 10. The inner bearings 42 and eccentric bearings 46 will operate at any point along the square shaft 44.

Furthermore, the various shanks 20 may be oscillated in different phase relationships to each other to reduce the vibration imparted to the frame member 10 as a whole. Therefore, there will be little or no vibration imparted unto the frame 11. It will be observed that the various eccentrics 46 along the shaft 44 resemble a crankshaft. The vibration problem is similar to a problem of balancing a crankshaft of an internal combustion engine. Therefore, by adjusting the eccentrics 46 so that some of the shanks 20 are being forced down while others are being forced upward that the resultant vibration transmitted through the bracket 36 to the clamp 12 can be balanced for the various shanks. Those with skill in the balancing art will realize that this balancing can be accomplished reasonably well if there are as many as three shanks present. Generally speaking, if only two shanks are present and they are 180° out of phase, that one end of the implement will tend to rock up when the other end of the implement rocks down. Some semblance of balance can be achieved with three shanks whereas with a greater number, greater balance can be achieved.

Figure 9:
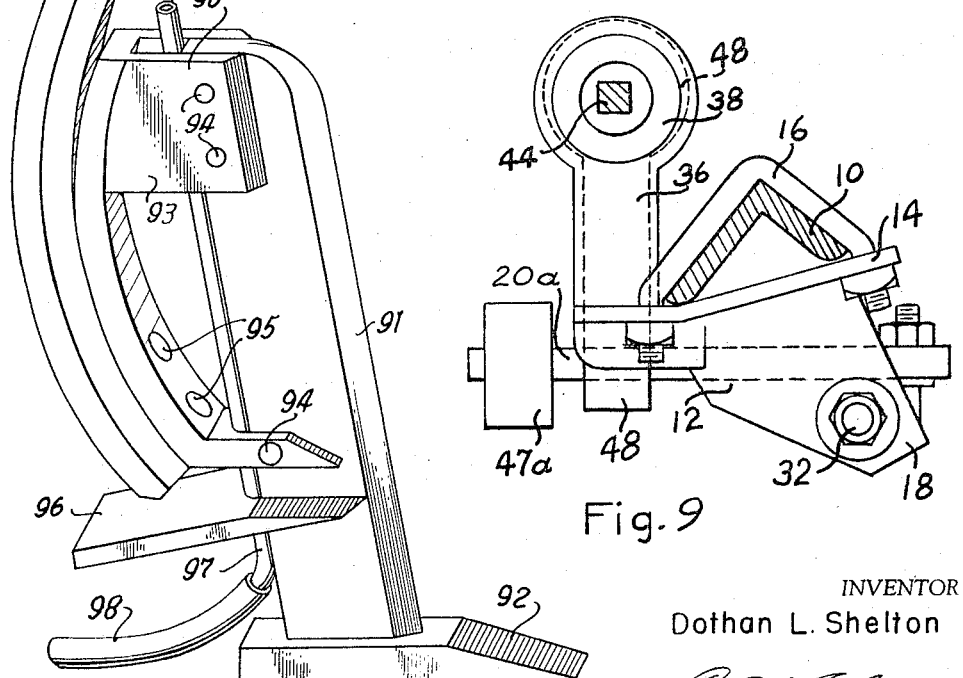
FIG. 9 is an elevational view of an alternate counterbalance for damping vibration in the frame members.

Further balancing of the frame assembly against vibration induced by the shank oscillating means may be achieved even with one or two oscillating shanks by the use of counterbalances placed at critical points on the frame member 10. Two embodiments of such counterbalances are seen in FIG. 8 and FIG. 9. In the embodiment seen in FIG. 8 an eccentric weight or counterbalance 47 is mounted on the drive shaft 44 to rotate therewith. The drive shaft 44 and the counterweight 47 are supported at the point of mounting on the frame member 10 by a clamp 13, which is the same in every particular as clamp 12, except that it is not provided with the depending flanges 18. It is particularly pointed out that the counterbalance 47 may also be placed at any point along the drive shaft 44 where properly supported, as on either side of the supporting brackets of clamp 12. The eccentric counterbalance 47 should be phased to counteract or damp the vibrations induced by the eccentric 46 and the connecting rod assembly 48 with which it is associated. Another method of inducing counter vibrations in the frame member 10 is seen in FIG. 9. In this embodiment a counterbalance arm 20a is mounted in the clamp assembly 12 in the same manner as the shank 20. On the rearward end of the counterbalance arm 20a is mounted a weght 47a. The connecting rod 48 is connected to the counterbalance arm 20a in the same manner as it is connected to the shank 20 and is operated in the same manner to oscillate the counterbalance arm 20a. As the arm 20a and the weight 47a are oscillated, vibrations are induced in the frame member 10. It is intended that this operation be phased to counteract or damp the vibrations induced by the shank oscillating means. The hydraulic means for oscillating the shank 20 may be used to operate the counterbalance arm 20a as disclosed in FIG. 4 and hereinafter described.

In FIGS. 4 and 5 there is disclosed a hydraulic means for oscillating the shank 20. Mounted on the brackets 34 (which correspond to brackets 36) is a hydraulic cylinder 60 which is provided with a piston 62 and a piston rod 64. The piston rod 64 is connected to the connecting rod assembly 49. The connecting rod assembly 49 is connected to the shank 20 by means of rubber or synthetic pads 66 which provide a cushioned contact between the connecting rod assembly 49 and the shank 20. The pads may be made of any suitable rubber-like material. Adjustment is provided by screw 59 to increase or decrease the oscillation imparted to the shank 20 by the connecting rod assembly 49.

In the embodiment disclosed in FIGS. 4 and 5 the piston 62 is actuated by means of hydraulic power supplied by the hydraulic system provided on the farm tractors (not shown). To control the flow of hydraulic fluid for driving the piston 62 there is provided a valve assembly 68 which is provided with a rotary valve 70 which has recessed therein two fluid channels 72 and 74 which connect with the ports 76 and 78, 80 and 82. The port 76 is connected by conventional means to the hydraulic pressure system provided on the tractor. The port 80 is connected by means of a return or bleed line to the hydraulic fluid receiver or tank. The rotary valve 70 is keyed to a drive shaft 84 by which it is rotated. The drive shaft 84 may be driven by any suitable means, such as the power take-off of the tractor, or by the wheels of the plow. In either case, the shaft 84 is set to turn at a predetermined speed suitable to impart the desired rate of oscillation to the shank 20. The rotary valve 70 positioned as shown in FIG. 4 would allow hydraulic fluid under pressure to flow through the channel 72 from port 76 to port 78 and into the lower cylinder chamber 86. Pressure of the hydraulic fluid against the under side of the piston 62 will cause it to move upward. Fluid in the upper cylinder chamber 88 will flow out through the port 82 and channel 74 to port 80 and back through the bleed line to the hydraulic fluid receiver tank. Rotation of the shaft 84 one quarter revolution will turn the rotary valve 70 a corresponding amount, which will bring channels 72 and 74 into position to connect ports 76 and 82, 78 and 80. Hydraulic fluid under pressure will flow through the channel 74 from port 76 to port 82 and into the upper cylinder chamber 88. Pressure of the fluid on the upper side of the piston 62 will move the piston downward. Hydraulic fluid in the lower cylinder chamber 86 will flow out through port 78 and channel 72 to port 80 and thence back through the bleed line to the fluid receiver tank. It is obvious that continued rotation of the valve 70 will set up oscillatory motion in the piston 62, which in turn will oscillate the connecting rod assembly 49 through the piston rod 64. The oscillatory motion of the connection rod assembly 49 through the medium of cushion pads 66 will impart oscillatory motion to the tool shank 20.

It will be apparent to those skilled in the art that I have illustrated two means for interconnecting the clamp 12 and shank 20 for oscillating the shank 20 about the axis of bolt 32, and that there would be many means for achieving vibration with desired phase relationship between the vibration of the various shanks 20.

It will be understood that with the invention as described at this point, that any of the various type spring shanks could be used. Thus it is that a spring shank as disclosed by Patent 2,699,715 can be used or one such as disclosed in my pending application Ser. No. 243,938 could be used. In fact, certain benefits result in using a rigid shaft design. In addition to this I have found that it also works with particular advantage with that particular shaped shank illustrated in FIG. 6 and described hereafter.

In the embodiment of this invention as herein disclosed the forward segment of the shank 20 comprises a straight horizontal section 17 provided at its forward end with a single hole 24 for attachment to clamp 12 on supporting frame member 10 (FIG. 6). The free portion of the shank extends rearwardly from the horizontal segment 17 and is curved downward on three separate tangent arcs, each having a different radius. Each of these arcs represents a 45° segment of a circle. Beginning with the horizontal segment 17 of the shank 20 and progressing rearwardly and downwardly, the horizontal segment extends rearwardly from the point of attachment by bolt 26 through vertical hole 24 and fairs smoothly into the first curved segment 19, which is bent downward, in an arc curved about a seven inch radius having its center 19a in a vertical plane which intersects the shank at approximately the point of tangency of the horizontal segment 17 with the first curved segment 19. Said arc curves downwardly for a distance of 45° at which point it fairs smoothly into the second curved segment 21, which is bent downward in an arc curved about a larger radius having its center 21a in a plane set at an angle of 45° to the horizontal and passing through the center of radius 19a of the first curved segment 19. Said arc curves downward for a distance of 45° at which point it fairs smoothly into the third curved segment 23, which is bent downward and forward in an arc curved about a radius of twelve inches with its center 23a in a horizontal plane passing through the center of radius 21a of the second curved segment 21. Said segment 23 curves downward for a distance of 45° at which point it terminates and is provided with two holes 25 for the attachment thereto of tillage tools or plow points.

The advantages which derive from a flexible tool carrying shank curved on a variable arc as plotted in FIG. 6 are more particularly pointed out as follows: On all sizes of shank formed on this pattern the tool carrying segment 23 is turned on a radius of preferably twelve inches, consequently all tillage tools designed for a twelve inch radius will fit all sizes of this shank. The upper curved segment 19 is preferably turned on a radius of seven inches. The short radius at this point has for its purpose to move the tool carrying end of the shank 20 forward more nearly beneath the pivotal point represented by the bolt 32. This gives better action in the shank 20 and at the same time reduces the length of the body of the shank 20. The intermediate curved segment 21 may be turned on a radius of from fifteen to twenty-two inches more or less. The purpose for providing a longer radius for this segment is to give a maximum clearance with a minimum of length of body to the shank 20. Referring to FIG. 6, the tool point which will be forward of the area of holes 25 will oscillate on a curved path in a direction at right angles to the axis of bolt 32 so that it is desirable to position the tool point almost beneath the axis of bolt 32 in order to provide an approximate horizontal movement to the tool point.

A comparison of the critical dimensions of a shank comprising an embodiment of my invention, with a conventional shank will clearly indicate the merits of the improvements herein disclosed:

|  | Radius, in. | Length of arc, in. | Vertical Rise, in. |
| --- | --- | --- | --- |
| 22 Inch Shank: |  |  |  |
| Conventional | 12 | 28.27 | 21.50 |
| Improved | 7, 15, 12 | 26.70 | 22.25 |
| Difference |  | 1.57 | (.75) |
| 25 Inch Shank: |  |  |  |
| Conventional | 14 | 33.00 | 24.50 |
| Improved | 7, 18.5, 12 | 29.45 | 24.65 |
| Difference |  | 3.55 | (.25) |
| 28 Inch Shank: |  |  |  |
| Conventional | 16 | 37.70 | 27.50 |
| Improved | 7, 22, 12 | 32.20 | 27.25 |
| Difference |  | 5.50 | .25 |

The above comparative analysis clearly indicates that in every size my improved shank has less length of body than the corresponding size of conventional spring shank, and as the size of the shank is increased, the conventional shank being curved on a single radius, as indicated in the column headed "Radius," has the added length spread through the entire curved body, while my improved shank, being curved on three separate centers, has the added length of body spread through the intermediate segment only, the upper and lower segments remaining constant with a seven and twelve inch radius, respectively, in all sizes of shank. The intermediate segment 21 being in an almost vertical plane or tangent thereto, (a portion at about right angles to straight segment 17), gives a higher ratio of vertical rise for length of shank body than is the case if the added length were spread through the entire curved portion. In the conventional shank, between the twenty-two and twenty-five inch sizes, the addition of 4.73 inches of length to the body gives about 3 inches additional vertical rise or clearance while on my improved shank, the addition of 2.75 inches results in about 2.50 inches increase in vertical rise. The same ratio holds between the twenty-five and twenty-eight inch sizes.

It is understood that the arcs of the segments 19, 21, and 23 may be changed from the dimension herein shown without departing from the spirit of this invention. For instance the lower segment 23 may be turned on a nine inch radius in order to make the shank adaptable to 9 inch radius tools. Or the upper segment 19 may be turned on a larger or smaller radius for the purpose of varying the action of the tool points.

In FIG. 1 there is disclosed a preferred embodiment of an injection tool 90 for the application of gaseous or fluid soil treatment material, e.g. fungicides or fertilizers such as anhydrous ammonia to the earth. This tool consists of a vertical furrowing blade 91 provided on its lower end with an opening shoe 92 and secured to a mounting bracket 93 by means of friction pins or rivets 94. Spaced above the opening shoe 92 and secured to the furrowing blade 91 is provided a cover shoe 96. There is an injection tube 97 fastened to the back of the furrowing blade 91 and connected by means of a flexible conduit to a gas tank not here shown. The injection tube 97 extends down the back of the furrowing blade 91 and is provided on its lower end with a pliable or flexible nozzle 98 which may be made of rubber or other suitable material. The bracket 93 is secured to shank 20 by bolts 95 through holes 25.

In operation the injection tool 90 is moved through the earth in a forward direction. The opening shoe 92 will penetrate the earth to lift the loosened earth, leaving a narrow open furrow. Gas is passed through the tube 97 and out through the pliable nozzle 98 into the open furrow. The pliable nozzle 98 extends rearwardly a sufficient distance to release the gaseous material at the point where the furrow is being closed in order to insure entrapment of the released gas in the earth where it is adsorbed for the desired purpose. The cover shoe 96 serves to close the opening immediately behind the blade 91 to prevent escape of the gaseous material to the atmosphere and at the same time to press the loosened soil down and close the furrow to seal in the gas. The oscillatory action naturally induced in the spring shank 20 as the tool 90 is drawn through the earth will cause the cover shoe 96 to trap the gaseous material. To further insure the covering of the furrow in heavy earth and in deep penetration, and also to lighten the draft of the tool 90, power induced oscillating action is imparted to the tool by means of the power driven oscillating devices hereinbefore described.

It will be apparent that the embodiments shown are only exemplary and that various modifications can be made in construction, materials, and arrangement within the scope of the invention as defined in the appended claims.

I claim as my invention:

1. An agricultural implement comprising in combination:
   (a) a frame member,
   (b) at least one clamp attached to the frame member,
   (c) a depending shank pivoted to the clamp about an axis normal to the direction of draft,
   (d) means interconnecting the clamp and shank for oscillating the shank about the axis by which it is pivoted to the clamp,
   (e) a plow point on the bottom of the shank,
   (f) a tube adapted to carry fluid soil treatment material attached to the bottom of the shank,
   (g) a portion of the tube trailing behind the plow so that the fluid material is expelled at a point to be sealed in the ground, and
   (gg) said portion of the tube trailing behind the plow constructed of pliant material.

2. The invention as defined in claim 1 wherein said shank includes,
 (h) a horizontal straight segment,
 (i) a first arcuate segment having a first radius of curvature attached to the straight segment,
 (j) a second arcuate segment having a second radius of curvature attached to the first arcuate segment,
 (k) a third arcuate segment having a third radius of curvature attached to the second arcuate segment, and
 (l) means on the third arcuate segment for attaching a plow point thereto,
 (m) the third radius of curvature at least as great as the first radius of curvature, and
 (n) the second radius of curvature greater than the third radius of curvature, and
 (o) a portion of the second segment about vertical.

3. An agricultural implement comprising in combination:
 (a) an elongated horizontal frame member,
 (b) at least three clamps attached to the frame member,
 (c) a depending shank pivoted to each clamp about a horizontal transverse axis,
 (cc) said shanks spaced apart from one another by several times their own width,
 (d) means on each clamp interconnecting each shank and clamp for oscillating the shank about the axis by which it is pivoted to the clamp, and
 (e) control means interconnecting said means for oscillating for phasing the individual means for oscillating so as to balance the frame member with the oscillating shanks thereon.

4. An agricultural earth furrowing implement comprising in combination:
 (a) a frame member,
 (b) a clamp attached to the frame member,
 (c) a depending shank pivoted to the clamp about an axis normal to the direction of draft,
 (d) means interconnecting the clamp and shank for oscillating the shank about the axis by which it is pivoted to the clamp,
 (dd) said shanks spaced apart from one another by several times their own width,
 (e) said means for oscillating the shank effective to induce vibrations in said shank,
 (f) means for inducing counter vibrations in the frame for balancing said frame member.

5. An agricultural implement comprising in combination:
 (a) a clamp adapted to attach to a frame member,
 (b) a pivot on said clamp,
 (c) a depending shank attached to said pivot,
 (d) a connecting rod mounted on said clamp for movement,
 (e) means on said clamp for oscillating said connecting rod.
 (f) a yieldable material connecting the connecting rod to the shank, and
 (g) means on the connecting rod for applying adjustable pressure to said yieldable material so that the oscillations of the connecting rod are transmitted to the shank cushioned in varying amounts.

6. The invention as defined in claim 5 wherein
 (h) the connecting rod has two thrust blocks thereon, one movable in relation to the other,
 (i) said yieldable material being between said shank and said thrust blocks, and
 (k) wherein said means for applying adjustable pressure is in the form of a screw for applying adjustable pressure to said movable thrust block.

7. The invention as defined in claim 5 wherein said yieldable material is an arcuate metal spring.

8. The invention as defined in claim 5 wherein said yieldable material is a rubber-like material.

9. An agricultural furrowing implement comprising in combination:
 (a) a frame member,
 (b) a plurality of clamps attached to the frame member,
 (c) a depending shank pivoted to each of the clamps,
 (d) about an axis transverse to the direction of draft,
 (dd) said shanks spaced apart from one another by several times their own width,
 (e) a shaft journalled for rotation on each of said clamps, and
 (f) a connecting rod,
 (g) said connecting rod connected on the lower end thereof to said shank,
 (h) the upper end of said connecting rod connected eccentrically to said shaft so that rotation of the shaft causes oscillation of the shank.

10. An agricultural furrowing implement comprising in combination:
 (a) a frame member,
 (b) a plurality of clamps attached to the frame member,
 (c) a depending shank pivoted to each of the clamps,
 (d) about an axis transverse to the direction of draft,
 (dd) a plow on the bottom of the shank,
 (e) a hydraulic cylinder connected to each of said clamps,
 (ee) said shanks spaced apart from one another by several times the width,
 (f) a piston mounted for reciprocation in said cylinder,
 (g) said piston connected to said shank,
 (i) a valve means for operatively connecting the cylinder to a source of hydraulic pressure, and
 (j) a shaft for rotating said valve means.

11. An agricultural article of manufacture comprising:
 (a) a plow shank including,
 (b) a horizontal straight segment,
 (c) a first arcuate segment having a first radius of curvature attached to the straight segment,
 (d) a second arcuate segment having a second radius of curvature attached to the first arcuate segment,
 (e) a third arcuate segment having a third radius of curvature attached to the second arcuate segment, and
 (f) means on the third arcuate segment for attaching a plow point thereto,
 (g) the third radius of curvature at least as great as the first radius of curvature, and
 (h) the second radius of curvature greater than the third radius of curvature, and
 (i) a portion of the second segment about vertical.

12. In an article of manufacture, to wit
 (a) an agricultural plow shank including,
 (b) a horizontal straight segment,
 (c) a concave curved segment which curves smoothly from the straight segment,
 (d) means near the end of the straight segment for attaching the shank to a frame, and
 (e) means near the end of the curved segment for attaching a plow point to the shank.
The improved shape of the curved segment characterized by:
 (f) a non-uniform radius of curvature,
 (g) that portion of the curved segment which is tangent to the vertical having a longer radius of curvature that either end.

13. An agricultural tool carrying shank comprising:
 (a) a horizontal straight segment having means for attachment to a supporting member, (b) a first arcuate segment attached to the horizontal segment and curved about a radius having its center in a vertical plane which intersects the shank at the approximate point of tangency of the first arcuate segment with the horizontal segment,
(c) a second arcuate segment attached to the first arcuate segment and curved about a radius having its center in a plane set at an angle of 45 degrees from the horizontal and passing through the approximate center of radius of the first arcuate segment,
(e) a third arcuate segment attached to the second arcuate segment and curved about a radius having its center in a horizontal plane passing through the approximate center of radius of the second arcuate segment,
(f) the third radius of curvature being as great as the first radius of curvature and the second radius of curvature being greater than the third radius of curvature,
(g) each of said arcuate segments flaring smoothly into the other and comprising an approximate 45 degree segment of a circle,
(h) and means provided on the third arcuate segment for attaching a tillage tool thereto.

References Cited by the Examiner

UNITED STATES PATENTS

| | | | |
|---|---|---|---|
| 1,060,548 | 4/1913 | Haralson | 172—118 X |
| 1,784,613 | 12/1930 | Reynolds | 172—707 |
| 1,838,355 | 12/1931 | Benjamin | 172—708 X |
| 2,443,492 | 6/1948 | Austin. | |
| 2,493,811 | 1/1950 | Graham | 172—708 X |
| 2,690,902 | 10/1954 | Ream. | |
| 2,722,902 | 11/1955 | Hyatt | 111—7 |
| 2,789,522 | 4/1957 | Barton | 111—6 |
| 2,849,969 | 9/1958 | Taylor | 111—7 |
| 2,853,030 | 9/1958 | Dugan | 111—7 |
| 2,949,871 | 8/1960 | Finn | 111—1 |
| 3,030,715 | 4/1962 | Bodine | 172—40 X |
| 3,103,250 | 9/1963 | Lamb | 172—40 |

FOREIGN PATENTS

| | | |
|---|---|---|
| 982,655 | 1/1951 | France. |
| 519,046 | 3/1940 | Great Britain. |

ABRAHAM G. STONE, *Primary Examiner.*

WILLIAM A. SMITH III, *Examiner.*